C. I. HALL.
MOTOR DEVICE OF THE INDUCTION TYPE.
APPLICATION FILED JUNE 6, 1916.
1,234,466.
Patented July 24, 1917.
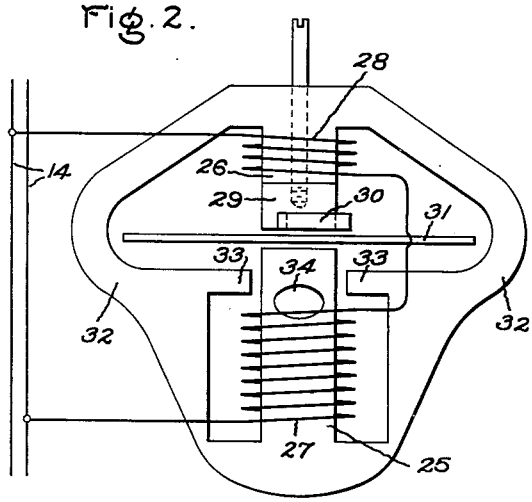
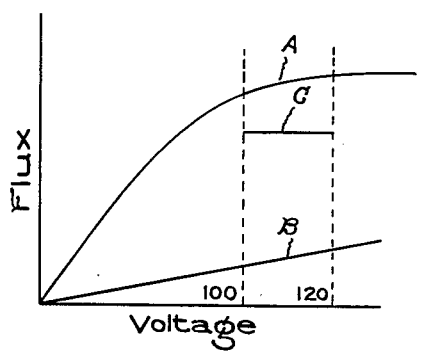
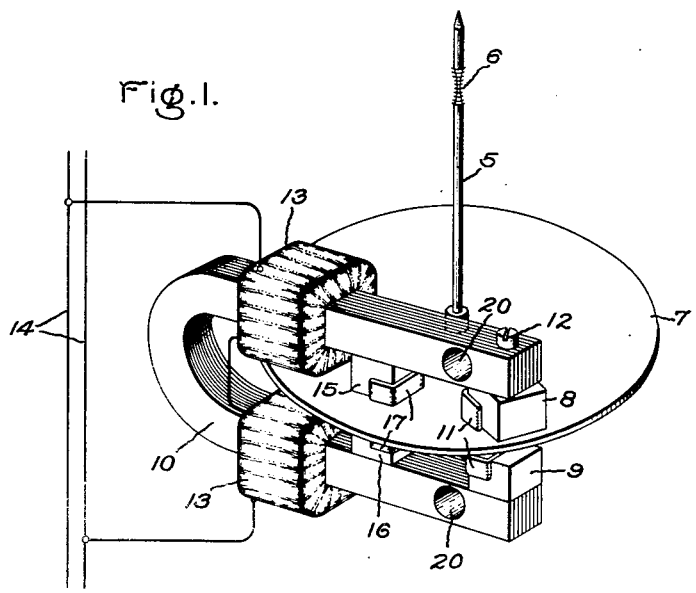
Inventor:
Chester I. Hall,
by Albert G. Davis
His Attorney.

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

MOTOR DEVICE OF THE INDUCTION TYPE.

1,234,466.      Specification of Letters Patent.      Patented July 24, 1917.

Application filed June 6, 1916. Serial No. 101,906.

*To all whom it may concern:*

Be it known that I, CHESTER I. HALL, a citizen of the United States, residing at Fort Wayne, in the county of Allen, State of Indiana, have invented certain new and useful Improvements in Motor Devices of the Induction Type, of which the following is a specification.

My invention relates to motor devices of the induction type, and particularly to motor devices of the shaded-pole induction motor type. Broadly, the object of the invention is to provide an improved motor device of the induction type, and more particularly to provide a motor device of this type whose operation is substantially independent of ordinary voltage fluctuations.

Motor devices of the induction type have many applications, and, merely by way of example, I will mention the use of such a device as a substantially constant speed motor, as a substitute for a clock, or the like, such as described in my application for Letters Patent of the United States Ser. No. 875,628, filed Dec. 5, 1914, and also the use of such a device in an electrical measuring instrument of the type described in my application for Letters Patent of the United States Ser. No. 846,786, filed June 23, 1914. The winding of such a motor device is usually connected to a commercial alternating current circuit, and, as is well known, such circuits are subject to voltage variations which frequently render the operation of the device most unsatisfactory for the purposes in hand. For example, where the motor device is used as a substitute for a clock, voltage fluctuations, such as occur in commercial electric circuits, materially affect the speed of the device, thereby greatly impairing its usefulness. Again, where the device is used in an electrical measuring instrument of the type previously mentioned, voltage fluctuations, if greater than about one per cent., may make the record obtained from the instrument too inaccurate to be of practical use. By my present invention I am able to eliminate, within reasonable limits, such errors in the operation of motor devices of this type arising from the ordinary fluctuations of voltage in commercial electric circuits.

An induction motor device of the type to which my present invention relates comprises suitable means for producing a shifting magnetic field within the influence of which is movably mounted an armature element. In accordance with my present invention, I diminish as far as possible any increase in the effective flux of the means producing the shifting magnetic field due to increase of voltage of the supply circuit. Preferably, I accomplish this end by working the magnetic circuit of such means in the neighborhood of saturation. I further provide the motor device with means for producing an auxiliary shifting magnetic field having an effect upon the armature element relatively opposite to that of the main field, and so design the device that the increase in the auxiliary field upon an increase in voltage in the supply circuit is substantially equal, and of course opposite in effect, to the increase in the main field.

The invention and its application to motor devices of the type hereinbefore referred to will now be better understood from the following description taken in conjunction with the accompanying drawings, in which:

Figure 1 is a diagrammatic perspective view of a motor device embodying my present invention; Fig. 2 is a diagrammatic view of a modified motor device; and Fig. 3 is an explanatory diagram.

Referring first to Fig. 1 of the drawings, there is diagrammatically shown a rotatably mounted shaft 5 having a worm 6 adapted to drive any suitable gearing. A disk armature element 7 of electrical conducting material, such for example as aluminum, is secured to the shaft 5, and is adapted to rotate in the air gap between the main poles 8 and 9 of a U-shaped electromagnet 10. Each of the poles 8 and 9 has a short-circuited coil 11 embracing substantially one-half of the pole face. The pole 8 is mounted on a bolt 12, and is thereby adapted to be adjusted with respect to the stationary pole 9. The U-shaped magnet 10 is made up of laminations in the usual manner, and has mounted thereon two series-connected current carrying coils 13 adapted to be connected to alternating current supply mains 14.

In accordance with my present invention, auxiliary poles 15 and 16 are secured to the U-shaped magnet 10 between the coils 13 and the poles 8 and 9. The pole 15 carries a short-circuited coil 17 embracing substantially one-half of the pole face. The short-circuited coil 17 is so mounted on the pole 15 that the resultant shifting magnetic field produced thereby is relatively opposite in its effect on the armature disk 7 to that of the main shifting magnetic field produced by the main shaded-poles 8 and 9.

Two paths or circuits for the magnetic flux of the U-magnet 10 are thus provided through the disk armature 7, one of these paths being across the air gap between the main poles 8 and 9, and the other path being across the air gap between the auxiliary poles 15 and 16. The normal torque producing flux of the motor device passes through the disk 7 across the air gap between the main poles 8 and 9. With this flux path alone, an increase in the ampere turns, due to an increase in voltage, materially changes the value of the flux, and, therefore, of the torque generated. In accordance with my present invention, the magnetic member providing the path for the normal torque-producing flux has a portion of restricted cross-sectional area so that the magnetic material in the vicinity of such portion may be worked in the neighborhood of its magnetic saturation. This restricted or reduced cross-sectional area of the magnetic member is produced by providing holes 20 in the U-shaped magnet 10 between the main poles 8 and 9 and the auxiliary poles 15 and 16. The cross-section of the magnetic material is thus reduced to a point at which the material is practically saturated, and hence an increase of ampere turns will only slightly increase the flux passing between the main poles 8 and 9, and thus only slightly increase the normal torque of the motor device. At the same time, an increase in ampere turns, due to an increase in flux between the main poles 8 and 9, will increase the flux passing between the auxiliary poles 15 and 16, and, since the effect of the flux is relatively opposite to that of the flux passing between the main poles 8 and 9, there will be a balancing action between these two fluxes, and the various parts can be so proportioned that the increase of the counter torque due to the flux passing between the auxiliary poles 15 and 16 exactly equals and neutralizes the increase in the main torque due to the flux passing between the main poles 8 and 9. In addition, the construction illustrated materially reduces the temperature error, since an increase in temperature will vary the phase displacement of both air gaps proportionately, such displacement being more or less compensating. This temperature correction may be further improved by the use of a material for the short-circuited coils of low temperature coefficient.

In Fig. 2 of the drawings, I have shown a modified construction of the device, operating, however, on substantially the same principle as the device in Fig. 1. The magnetic member of the motor device comprises main magnetic cores 25 and 26 upon which are wound a main coil 27 and an auxiliary bucking coil 28, respectively. A pole piece 29 carrying a short-circuited coil 30 is adjustably mounted at the lower end of the core 26 and is separated from the upper end of the core 25 by an air gap in which is rotatably mounted the disk armature 31. The magnetic circuit of the cores 25 and 26 is completed by lateral members 32 of magnetic material. Auxiliary poles 33 of magnetic material extend from the lateral members 32 toward the main core 25 and are separated therefrom by air gaps of suitable width. A hole 34 is provided in the main magnetic core 25 in order to suitably reduce the cross section of the magnetic material of the core.

The operation of the motor device of Fig. 2 is substantially as follows:—The coil 27 is the primary operating coil, while the coil 28, connected in series therewith, is arranged as a bucking coil, that is to say, the magnetic fluxes set up by the coils 27 and 28 are relatively in opposition. The magnetic circuit for the flux produced by the coil 27 includes the portion of reduced cross-sectional area of the main core 25 resulting from the hole 34. The hole 34 is of such proportions that this magnetic circuit is saturated under normal operating conditions, and has a characteristic curve, of say between 100–200 volts, as indicated at A in Fig. 3. The magnetic circuit for the flux produced by the bucking coil 28 includes the main air gap between the pole 29 and the main core 25 and the air gaps between the auxiliary poles 33 and the main core 25 and is unsaturated. The characteristic curve of this magnetic circuit between the same voltage limits is represented in Fig. 3 at B. The resultant of the two superimposed fluxes passing through the disk armature 31 between the pole 29 and the core 25 is then substantially represented by line C of Fig. 3, and it will be observed that the line C is approximately horizontal, which means that the effective torque producing flux of the device is substantially constant between the voltage limits of 100 to 120.

From the foregoing explanation it will be evident that my improved motor device includes an induction motive means for producing a main torque for rotating the armature in one direction and an auxiliary countertorque tending to oppose such rotation. The fluxes producing these torques are set up by the same current carrying coil in the device of Fig. 1, and by series-connected coils in the device of Fig. 2. Thus, in both devices an increase in the ampere turns developing one flux is inherently accompanied by a proportionate increase in the ampere turns developing the other flux. The increase in the main flux, due to an increase in ampere turns occasioned by an increase in the voltage of the supply circuit, is made as small as possible by working the magnetic circuit of the main flux substantially at the point of its magnetic saturation. Thus, the compensation which must be supplied by the opposing auxiliary flux is minimized to a very considerable extent. It will of course be understood that the main torque producing flux passing through the armature between the main poles is materially greater than the opposing auxiliary flux, since the function of the latter flux is merely to compensate for variations in the main flux occasioned by voltage fluctuations of the supply circuit.

I have herein shown and particularly described certain embodiments of my invention for the purpose of explaining its principle and showing its application, but numerous modifications of the details of construction and arrangement of these embodiments and other applications will present themselves to those skilled in the art. I, therefore, wish to cover by the following claims all modifications within the spirit of the invention.

What I claim as new and desire to secure by Letters Patent of the United States, is:

1. A motor device of the induction type comprising a rotatable armature, induction motive means for rotating said armature, means electrically associated with said induction motive means for producing a countertorque opposing the rotation of said armature, and means whereby fluctuations of voltage produce substantially equivalent effects upon said induction motive means and said countertorque producing means.

2. A motor device of the induction type comprising a movable armature, and induction motive means inductively related to said armature and including a magnetic circuit providing two paths for the magnetic flux, one of said paths being arranged to carry the main torque producing flux and having a portion of restricted cross-sectional area and the other path being arranged to carry a flux whose effect on said armature is relatively opposite to that of the main torque producing flux.

3. A motor device of the induction type comprising a movable armature, induction motive means inductively related to said armature and adapted to produce a main flux for moving said armature in one direction and an auxiliary flux tending to oppose such movement of the armature, and a magnetic circuit included in said induction motive means and having a portion of restricted cross-sectional area through which passes said main flux so that normally this flux substantially saturates such portion of the magnetic circuit.

4. A motor device of the induction type comprising a movable armature, induction motive means inductively related to said armature and adapted to produce a main torque for moving said armature in one direction and an auxiliary countertorque tending to oppose such movement of the armature, and a magnetic member included in said induction motive means and providing two paths for the magnetic fluxes producing said torques, the path which carries the flux producing the main torque having a portion of restricted cross-sectional area so that this flux substantially saturates such portion.

5. A motor device of the induction type comprising a movable armature, induction motive means inductively related to said armature and adapted to produce a main torque for moving said armature in one direction and an auxiliary countertorque tending to oppose such movement of the armature, and a magnetic member included in said induction motive means and having main and auxiliary poles, said main poles being included in the magnetic circuit of the main flux producing the main torque and said auxiliary poles being included in the magnetic circuit of the flux producing the auxiliary countertorque, said magnetic member having a portion of restricted cross-sectional area in the magnetic circuit of the main flux so that normally the main flux substantially saturates this circuit.

6. A motor device of the induction type comprising a movable armature, means including a winding and a magnetic member for producing a main shifting magnetic field adapted to move said armature in one direction, and means coöperating with said last mentioned means for producing an auxiliary shifting magnetic field whose effect on said armature is relatively opposite to that of said main field.

7. A motor device of the induction type comprising a movable armature, electric current carrying means inductively related to said armature, and means whereby the current flowing in said current carrying means produces two shifting magnetic fields adapted to have relatively opposite effects upon said armature.

8. A motor device of the induction type comprising a movable armature, means inductively related to said armature for producing a main torque for moving said armature in one direction and an auxiliary countertorque tending to oppose such movement of the armature, a magnetic member included in said means and providing two magnetic circuits for the fluxes producing said torques, and means whereby the magnetic circuit of the flux producing the main torque is under normal operating conditions substantially saturated.

9. A motor device of the induction type comprising a movable armature, means inductively related to said armature for producing a main torque for moving said armature in one direction and an auxiliary countertorque tending to oppose such movement of the armature, said means including a magnetic member providing under normal operating conditions a substantially saturated magnetic circuit for the flux producing said main torque and an unsaturated magnetic circuit for the flux producing said counter-torque.

10. A motor device of the induction type comprising a movable armature, means inductively related to said armature for producing a main torque for moving said armature in one direction and an auxiliary countertorque tending to oppose such movement of the armature, and a magnetic member included in said means and providing two magnetic circuits for the fluxes producing said torques, said magnetic member having a hole in the circuit through which passes the flux producing said main torque.

In witness whereof, I have hereunto set my hand this 2nd day of June, 1916.

CHESTER I. HALL.